Figures 2, 5:
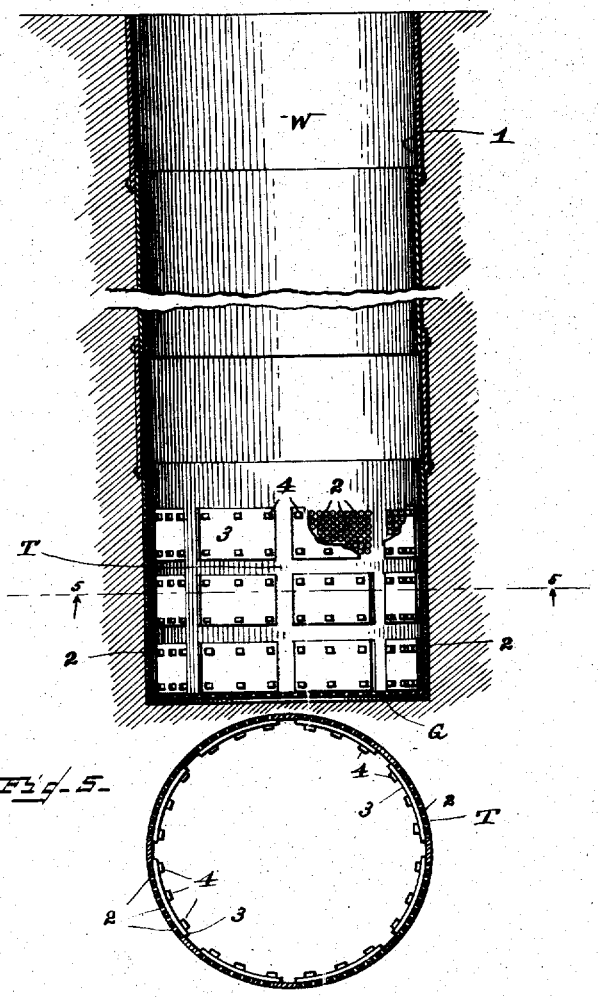

No. 12,107. REISSUED APR. 28, 1903.

D. H. MAURY.

WELL INLET.

APPLICATION FILED MAR. 2, 1903.

2 SHEETS—SHEET 1.

WITNESSES

Edwin L. Yewell.

R. H. Bishop.

INVENTOR,

Dabney H. Maury,

By Daniel Davis

Attorneys.

No. 12,107. REISSUED APR. 28, 1903.
D. H. MAURY.
WELL INLET.
APPLICATION FILED MAR. 2, 1903.
2 SHEETS—SHEET 2.
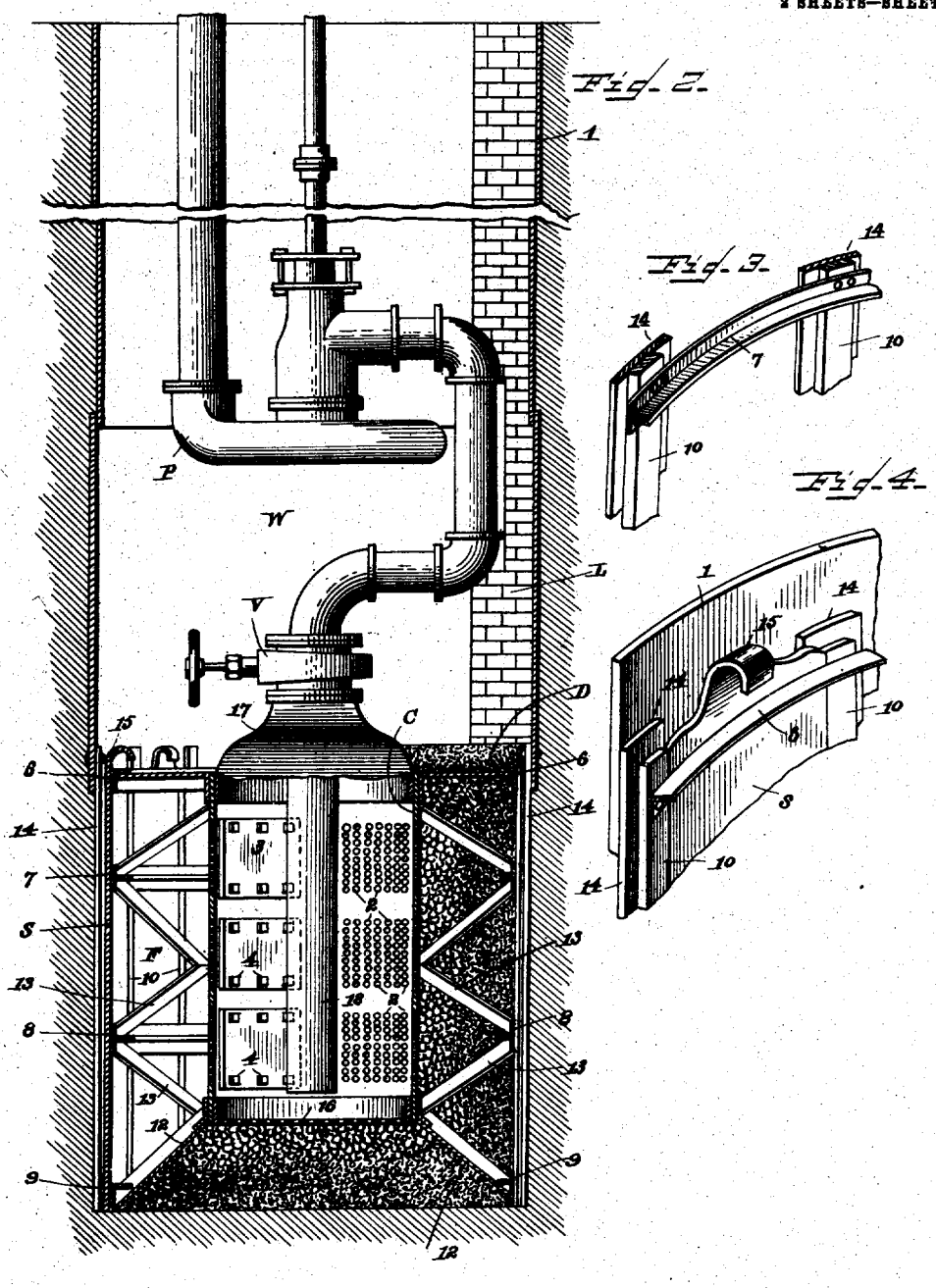
WITNESSES
Edwin L. Yewree.
R. W. Bishop.
INVENTOR,
Dabney H. Maury,
By Daniel Davis,
Attorneys.

UNITED STATES PATENT OFFICE.

DABNEY H. MAURY, OF PEORIA, ILLINOIS.

WELL-INLET.

SPECIFICATION forming part of Reissued Letters Patent No. 12,107, dated April 28, 1903.

Original No. 704,896, dated July 15, 1902. Application for reissue filed March 2, 1903. Serial No. 145,863.

*To all whom it may concern:*

Be it known that I, DABNEY H. MAURY, a citizen of the United States, residing at Peoria, in the county of Peoria and State of Illinois, have invented certain new and useful Improvements in Well-Inlets, of which the following is a specification.

This invention relates to improvements in inlets or inlet-terminals for incased wells, particularly for what are commonly known as "open" wells, and the diameter of which is so great that they can actually be entered instead of being merely accessible from the top, as is the case with the ordinary "bored" or "driven" well.

The objects of the invention are to provide an improved construction by the employment of which the use of screens or strainers for removing debris and sediment from the incoming water can be done away with with even better results, so far as the obtaining of an adequate volume of clear water is concerned, than if such strainers were used, and to provide a generally improved construction of inlet-terminal for open wells, particularly of that type of such wells in which that portion of the interior above the inlet-terminal forms a "dry" well adapted to receive pumping machinery of any suitable variety.

The invention consists in the matters herein set forth, and particularly pointed out in the appended claims.

In the accompanying drawings, Figure 1 is a sectional view of an ordinary open well provided with an inlet-terminal constructed in accordance with my improvements. Fig. 2 shows a similar well provided with a somewhat more highly organized inlet-terminal constructed in accordance with my improvements. Figs. 3 and 4 are perspective views of some details of the construction shown in Fig. 2. Fig. 5 is a horizontal section taken on line 5 5 of Fig. 1.

In Fig. 1 of said drawings, 1 designates the steel casing on an ordinary open well W of indefinite depth and the diameter of which may be anything desired, except that it must always be large enough to be entered, and so accessible from its interior. The lowermost section of this casing 1 constitutes in this instance the inlet-terminal T of the well, and it is accordingly punched through with a great number of holes 2, through which the water from the surrounding earth is ultimately designed to enter. In the sinking of the well, however, these holes 2 are tightly closed by suitable means removable from the interior of the casing, such means consisting in this instance and desirably by metal covering-plates 3, that are removably secured to the casing by bolts or cap-screws 4, which while holding the covers tightly in place may be readily unscrewed to permit the removal of the plates.

In the sinking of the well either the pneumatic process or any of the other well-known methods of accomplishing work of this character may be employed, the cover-plates 3 in the meantime being bolted firmly in place. Then when the well has been sunk to the proper depth and supplied, if necessary, with a bottom plate or grating G the covers 3 are unbolted from within and permanently removed, leaving the holes 2 uncovered and free to permit the influx of water through them. The first water entering through these holes (which are desirably made of considerable diameter—three-fourths of an inch or more, for example—so that they are not likely to become clogged) will bring with it more or less sand, gravel, and the like; but as the flow continues such finer material as can successfully pass through the holes will be gradually washed into and may be pumped out of the well, while the crowding toward the casing of larger stones and pieces of rock will ultimately cover the inlet-openings and build up a natural filter about them, which will keep out the further entrance of sand and sediment without interfering with the influx of water.

In the more highly organized construction (shown in Fig. 2) the inlet-terminal consists of a skeleton outer cylinder and a perforated inner cylinder C, which latter corresponds with the terminal cylinder T of the more elemental construction (shown in Fig. 1) and is similarly provided with holes 2, that are initially closed by removable cover-plates 3, as previously described in connection with said Fig. 1. The skeleton outer cylinder is formed, as herein shown, of circular hoops or bands 6, 7, 8, and 9, of angle or channel iron, that are connected together at intervals by vertical strips 10. A bulkhead 11, provided with manholes, (not shown in the drawings,) extends between the upper hoop or band 6 and the upper end of the inner cylinder, and a downwardly-flaring bottom plate 12 extends between the lower end of said inner cylinder and the lower hoop or band 9, while an angular bracing 13 serves to strengthen the structure between its ends. Such skeleton outer cylinder is then originally and throughout the entire process of sinking the well (which process may, as before, be of any character deemed most suitable for the particular situation in hand, whether pneumatic or otherwise) completely closed in by sections S, of sheeting, which are arranged to slide longitudinally between the vertical strips 10, being held in place there by wider strips 14, secured over the strips 10, to form guideways for the sections. This leaves between the outer and inner cylinders and between the upper bulkhead 11 and bottom plate 12 an inclosed space F, which is filled in through the manholes with stones and gravel to form a filter-bed or screen, the material being desirably packed in by hand, so as to bring the coarsest portions next to the perforated inner cylinder. During the sinking operation this filter-bed is completely inclosed by the sheeting, and the terminal presents to the surrounding earth a continuous and substantially smooth exterior, which does not interfere with the sinking operation. The narrow spaces between the sections of sheeting and the upper hoop 6 on the one side and the steel casing of the well W on the other are designed to be closed and made tight against air or water during sinking by calking with hemp, wooden wedges, or other suitable material, over which is preferably then poured melted coal-tar pitch. Then upon completion of the sinking operation the sheeting is withdrawn section by section, (by applying a suitable tackle to an eye or hook 15 at the upper end of each section and pulling it vertically upward from between its guides,) and this leaves the outer circumference of the terminal entirely open, so that the water from the surrounding earth can enter it freely and percolate through the filter-bed toward the inlet-openings 2, which when uncovered by the removal of the plates 3 admit the water to the inner cylinder C. Before the removal of the plates 3 a filling of stones and gravel will desirably be packed in beneath the conical bottom wall 12 and beneath a perforated bottom plate 16, secured in the lower end of the cylinder C and through which also water may enter the latter. The top of the inner cylinder is herein shown as closed by a tight head 17, through which a suction-pipe 18 is extended downwardly into the lower part of the cylinder C. This suction-pipe is controlled by a gate-valve V, from the upper side of which the water is conducted up to a pump P, that may be of any type or variety desired and may be located wherever found convenient. Upon the removal of the sheeting it is designed that the joints all around the bulkhead 11 shall be made waterproof and said bulkhead covered with a layer of concrete D, upon which the lining-walls L of the upper well may be started, it being designed that this upper well shall be maintained normally dry and free from water, so as to be ready of access at all times.

The well-inlet thus described presents an enormous surface to the gathering of the water-supply desired and insures its entering the suction-well in a clear and purified condition, while at the same time avoiding the use of fine screens or small inlet-perforations likely to become clogged or foul. In its broader aspects, however, it will be understood that my invention is not limited to the particular constructions shown or to anything further than the plain terms of the appended claims necessarily import.

I claim as my invention—

1. A well-inlet comprising an outer skeleton cylinder, removable sheeting temporarily closing said outer cylinder, a perforated inner cylinder, and means for temporarily closing the perforations in the inner cylinder.

2. A well-inlet comprising an outer skeleton cylinder, longitudinally-slidable sheeting temporarily closing said outer cylinder, a perforated inner cylinder, and means for temporarily closing the perforations in said inner cylinder.

3. A well-inlet comprising an outer skeleton cylinder, removable sheeting temporarily closing said outer cylinder, a perforated inner cylinder, means for temporarily closing the perforations in said inner cylinder, and an annular filter-bed packed between the inner and outer cylinders.

4. An inlet-terminal for well-casings comprising an outer cylinder, removable sheeting temporarily closing said outer cylinder, a perforated inner cylinder, means for temporarily closing the perforations in said inner cylinder, and a perforated bottom in said inner cylinder.

5. An inlet-terminal for well-casings comprising an outer skeleton cylinder, removable sheeting temporarily closing said outer cylinder, a perforated inner cylinder, means for temporarily closing the perforations in said inner cylinder, a perforated bottom in said inner cylinder, and a filter-bed packed around and beneath said inner cylinder.

6. The combination with a well-casing, of an inlet-terminal separated from the rest of the casing by a water-tight bulkhead, and comprising an apertured cylinder and temporary closures removably closing the apertures in the cylinder on the interior thereof, and a suction-pipe leading from the cylinder up through the bulkhead.

7. The combination with a well-casing and pump, of an inlet-terminal separated from the rest of the casing by a water-tight bulkhead and comprising an outer skeleton cylinder, removable sheeting temporarily closing said outer cylinder, a perforated inner cylinder, means for temporarily closing the perforations in the inner cylinder, and a suction-pipe leading to the pump from the inner cylinder.

8. The combination with a well-casing and pump, of an inlet-terminal separated from the rest of the casing by a water-tight bulkhead and comprising an outer skeleton cylinder, removable sheeting temporarily closing said outer cylinder, a perforated inner cylinder, means for temporarily closing the perforations in the inner cylinder, a suction-pipe leading to the pump from the inner cylinder, and a filter-bed packed around the inner cylinder.

9. The combination with a well-casing and pump, of an inlet-terminal separated from the rest of the casing by a bulkhead and comprising an outer cylinder, removable sheeting temporarily closing said outer cylinder, a perforated inner cylinder, means for temporarily closing the perforations in the inner cylinder, a perforated bottom in said inner cylinder, a suction-pipe leading to the pump from the inner cylinder, and a filter-bed packed around and beneath the inner cylinder.

In testimony that I claim the foregoing as my invention I affix my signature, in presence of two subscribing witnesses, this 3d day of February, A. D. 1903.

DABNEY H. MAURY.

Witnesses:
T. L. BURKLAND,
H. J. MONAHAN.